US012804513B2

(12) United States Patent
Zhao et al.

(10) Patent No.: US 12,804,513 B2
(45) Date of Patent: Nov. 17, 2026

(54) DYNAMIC NETWORKING METHOD, APPARATUS, AND ELECTRONIC DEVICE

(71) Applicant: Lenovo (Beijing) Limited, Beijing (CN)

(72) Inventors: Jianzu Zhao, Beijing (CN); Xuwei Hu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 400 days.

(21) Appl. No.: 18/544,746

(22) Filed: Dec. 19, 2023

(65) Prior Publication Data

US 2024/0224157 A1 Jul. 4, 2024

(30) Foreign Application Priority Data

Dec. 30, 2022 (CN) ........................ 202211724935.5

(51) Int. Cl.
*H04W 40/24* (2009.01)
*H04W 4/80* (2018.01)
*H04W 12/03* (2021.01)
*H04W 84/20* (2009.01)

(52) U.S. Cl.
CPC ......... *H04W 40/248* (2013.01); *H04W 12/03* (2021.01); *H04W 84/20* (2013.01)

(58) Field of Classification Search
CPC ..... H04W 40/248; H04W 84/20; H04W 4/80; H04W 12/03
See application file for complete search history.

(56) References Cited

U.S. PATENT DOCUMENTS

| | | | | |
|---|---|---|---|---|
| 7,421,578 | B1 * | 9/2008 | Huang .................. | H04L 63/065 370/254 |
| 11,838,151 | B1 * | 12/2023 | Jones .................. | H04L 25/0224 |
| 12,107,724 | B2 * | 10/2024 | Bang ........................ | H04L 41/24 |
| 2017/0324650 | A1 * | 11/2017 | Przygienda ............. | H04L 45/60 |
| 2018/0139090 | A1 * | 5/2018 | Geiger .................. | H04L 41/085 |
| 2019/0124581 | A1 * | 4/2019 | Guo .................... | H04L 67/1051 |
| 2023/0239765 | A1 * | 7/2023 | Bahrami ............... | H04W 40/32 370/329 |
| 2024/0015022 | A1 * | 1/2024 | Parkar ................... | H04L 9/3234 |
| 2024/0107302 | A1 * | 3/2024 | Whittaker ............. | H04W 12/06 |
| 2024/0107430 | A1 * | 3/2024 | Whittaker ............. | H04W 12/71 |
| 2024/0380661 | A1 * | 11/2024 | Wang .................... | H04W 24/02 |

* cited by examiner

*Primary Examiner* — Kent Krueger
(74) *Attorney, Agent, or Firm* — ANOVA LAW GROUP, PLLC

(57) ABSTRACT

A dynamic networking method applied to a first device includes obtaining first networking feature data, broadcasting a first election message and receiving a second election message broadcast by a second device, receiving an enrollment message broadcast by a determined master device, and sending an enrollment response message to the master device according to the access identification to access the networking access point. The first networking feature data represents a networking capability of the first device. The first election message includes the first networking feature data. The second election message includes second networking feature data of the corresponding second device. The master device is determined according to the first networking feature data and the second networking feature data. The enrollment message includes an access identification of a networking access point created by the master device.

19 Claims, 5 Drawing Sheets

DYNAMIC NETWORKING METHOD, APPARATUS, AND ELECTRONIC DEVICE

CROSS-REFERENCE TO RELATED APPLICATION

The present disclosure claims priority to Chinese Patent Application No. 202211724935.5, filed on Dec. 30, 2022, the entire content of which is incorporated herein by reference.

TECHNICAL FIELD

The present disclosure relates to the communication technology field and, more particularly, to a dynamic networking method, an apparatus, and an electronic device.

BACKGROUND

When a plurality of devices are on a network, a master device and a secondary device are used for networking. Thus, which device of the plurality of devices is configured as the master device and which device of the plurality of devices is configured as the secondary device can impact the networking efficiency of the devices.

To address the above problem, a voting-based election method among the devices is provided to determine the master device and the secondary device from the plurality of devices. The election result of the master device is determined according to the voting speed of other devices, which cannot ensure that the elected master device can satisfy the high-quality service requirements in the current scenario.

SUMMARY

An aspect of the present disclosure provides a dynamic networking method applied to a first device. The method includes obtaining first networking feature data, broadcasting a first election message and receiving a second election message broadcast by a second device, receiving an enrollment message broadcast by a determined master device, and sending an enrollment response message to the master device according to the access identification to access the networking access point. The first networking feature data represents a networking capability of the first device. The first election message includes the first networking feature data. The second election message includes second networking feature data of the corresponding second device. The master device is determined according to the first networking feature data and the second networking feature data. The enrollment message includes an access identification of a networking access point created by the master device.

An aspect of the present disclosure provides a dynamic networking apparatus applied to a first device, including a first networking feature data acquisition module, a first election message broadcasting module, a second election message reception module, an enrollment message reception module, and an enrollment module. The first networking feature data acquisition module is configured to obtain first networking feature data. The first networking feature data represents a networking capability of the first device. The first election message broadcasting module is configured to broadcast a first election message. The first election message includes the first networking feature data. The second election message reception module is configured to receive a second election message broadcast by a second device. The second election message includes second networking feature data of the corresponding second device. The enrollment message reception module is configured to receive an enrollment message broadcast by a determined master device. The master device is determined according to the first networking feature data and the second networking feature data. The enrollment message includes an access identification of a networking access point created by the master device. The enrollment module is configured to send an enrollment response message to the master device according to the access identification to access the networking access point.

An aspect of the present disclosure provides an electronic device, including a communication interface and a processing apparatus. The processing apparatus includes a processor and a memory. The memory stores a computer program that, when executed by the processor, causes the processor to obtain first networking feature data, broadcast a first election message, receive a second election message broadcast by a second device, receive an enrollment message broadcast by a determined master device, and send an enrollment response message to the master device according to the access identification to access the networking access point. The first networking feature data represents a networking capability of the first device. The first election message includes the first networking feature data. The second election message includes second networking feature data of the corresponding second device. The master device is determined according to the first networking feature data and the second networking feature data. The enrollment message includes an access identification of a networking access point created by the master device.

DETAILED DESCRIPTION OF THE EMBODIMENTS

To address the technical problems described in the background, the present disclosure provides a method of selecting a device with an optimal networking capability as a master device by considering networking capabilities of devices that are currently to be networked in the process of selecting the master device. Thus, high networking efficiency can be realized, the performance of the overall device interconnection environment can be improved, and the selected master device can be ensured to meet high-quality service requirements in a complex environment.

The technical solution of embodiments of the present disclosure is described in detail in connection with the accompanying drawings of embodiments of the present disclosure. Described embodiments are merely some embodiments of the present disclosure, not all embodiments. Based on embodiments of the present disclosure, all other embodiments obtained by those ordinary skills in the art without creative effort should be within the scope of the present disclosure.

Figure 1:
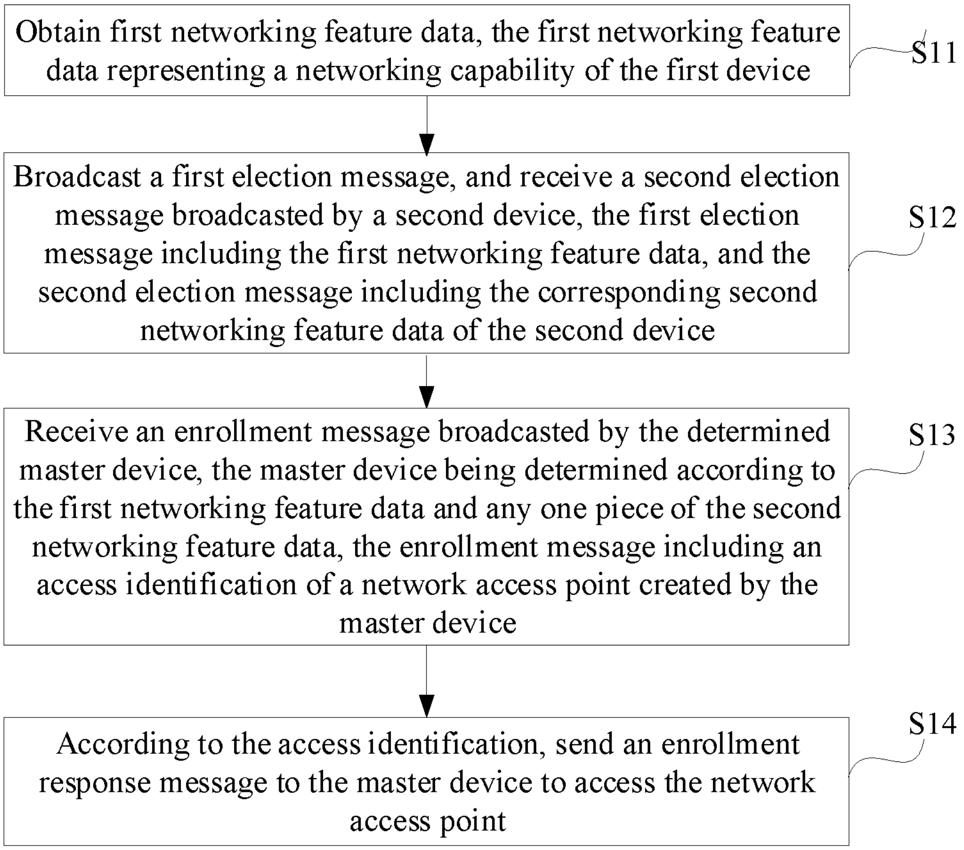
FIG. 1 illustrates a schematic flowchart of a dynamic networking method according to some embodiments of the present disclosure.

FIG. 1 illustrates a schematic flowchart of a dynamic networking method according to some embodiments of the present disclosure. The method can be applied to a first device. The first device can be a terminal device having a networking capability. The networking capability can be demonstrated by basic assemblies configured at the terminal device or by an expansion device connected to the terminal device, which depends on the actual situation. In some embodiments, the first device can include but is not limited to smartphones, smart home appliances, laptops, network devices (e.g., wireless routers), etc. Any one of the terminal devices can be selected as the first device as needed.

As shown in FIG. 1, the dynamic networking method of embodiments of the present disclosure includes but is not limited to the following processes.

At S11, first networking feature data is obtained, and the first networking feature data represents a networking capability of the first device.

When a previous master device is disconnected, or a master device and a secondary device needs to be re-determined in the environment, if a plurality of devices that are to be networked in the current environment are not determined as an inheriting master device during a previous networking period, networking feature data representing the networking capability of any to-be-networked device in the current environment can be obtained first, i.e., after the first device enters a selection mode, to determine a device with the optimal networking capability as the master device. The networking feature data can be referred to as the first networking feature data. The present disclosure does not limit data content included in the first networking feature data. The first networking feature data can be determined according to at least one performance parameter configured for or supported by the first device.

In some embodiments, the device networking capability can include, but is not limited to, one or more of an external network bandwidth (represented by numerical values such as gigabits/megabits, rate, etc.), image display (represented by image configuration parameters such as resolution, refresh rate, and/or clarity), audio output (represented by audio configuration parameters such as high/low frequency, Dolby, or combinations), audio input (represented by configuration parameters such as clarity), video input (represented by configuration parameters such as resolution), etc. Additionally, the device type of the to-be-networked device, such as home terminal, Network Attached Storage (NAS) device, Home Theater Personal Computer (HTPC) TV, router, etc., can be taken into account, or other expansion information can also be taken into account to represent other capabilities of the first device. Thus, weights of different capabilities can be combined to obtain the networking capability of the first device. The method for obtaining the device networking capability is not limited in the present disclosure and is determined as needed.

The data of the plurality of capabilities included in the networking feature data of a device can include but is not limited to data content described above and can be determined as needed. In addition, different types of devices can include but are not limited to the plurality of capabilities, which can be different. For a same capability, parameters can be different. Thus, different devices can have different networking capabilities, which are not described in detail here.

When the devices are started to network, different types of devices can enter a dynamic networking mode differently. For a new device that is first used, a trigger method for dynamic networking can be configured according to the instructions of the device. Thus, when the device is used for networking subsequently, the device can be directly started to participate in networking based on this setting.

In addition, for a device that can operate independently, the device can be turned on to start dynamic networking through the switch button of the device (e.g., a specific physical key or a virtual key in an output networking page) or a dedicated application (APP) that is connected. For networked devices, a master device can exist in the networking. The master device can broadcast to secondary devices for redefining a master device to start dynamic networking, which includes but is not limited to the methods of starting the dynamic networking for different devices of embodiments of the present disclosure.

At S12, a first election message is broadcast, and a second election message broadcast by a second device is received. The first election message includes the first networking feature data, and the second election message includes the corresponding second networking feature data of the second device.

In the process of selecting the master device from the plurality of devices, after the plurality of devices enter the election mode and initiate dynamic networking, networking feature data representing the networking capabilities of the devices can be obtained in the method described above. Thus, each of the devices participating in the dynamic networking can know the networking capabilities of the devices participating in the dynamic networking. The present disclosure does not limit the implementation process of broadcasting the election message within the plurality of devices.

Based on this, the data range of the election message broadcast by each device (e.g., the first device and the second device) that needs to be dynamically networked can include the networking feature data of the device. In addition, according to a message structure of the election message, the networking feature data can further include one or more of device identification, communication identification, message header, access address, length, and verification code, which can be determined according to the broadcast protocol of the election message. The present disclosure does not limit the message structure, content, and broadcast implementation of the election message.

Since the plurality of devices that need to participate in the dynamic networking initiate the dynamic networking at different time, and different devices can have different data processing capabilities, the time consumed by the plurality of devices to calculate the networking feature data currently included in the plurality of devices. Thus, the broadcast time for the plurality of devices to broadcast the election message can be different. The present disclosure does not limit the broadcast time, which is determined as needed.

At S13, an enrollment message broadcast by the determined master device is received. The master device is determined according to the first networking feature data and any one piece of the second networking feature data. The enrollment message includes an access identification of a network access point created by the master device.

At S14, according to the access identification, an enrollment response message is sent to the master device to access the network access point.

To continue with the above analysis, after the first device obtains the first networking feature data of the first device and the second networking feature data from at least one second device, the first device can compare the first networking feature data with each piece of the received second networking feature data to determine which device among the first device and the corresponding second device has stronger the networking capability to better meet the service requirements in the current scene. The implementation process is not described in detail.

After comparing the networking capabilities of the plurality of devices participating in dynamic networking, the master device of the dynamic networking can be determined according to the comparison result. For example, the device with the optimal networking capability can be the master device, which can be the first device or the second device. Then, the master device can create a networking access point AP (e.g., a wireless network hotspot, which is not described in detail here), and determine the access identification of the networking access point AP. Then, by broadcasting the enrollment message including the access identification, the master device can notify other devices of which device is the master device for the dynamic networking and wait for the secondary devices of the dynamic networking to be accessed to the networking access point created by the master device according to the access identification to form the network with a corresponding structure.

For devices like smartphones, laptops, etc., a plurality of antenna modules can be configured to support creating a plurality of network access points to meet the requirements of a plurality of dynamic networks. Different devices can be used to form different dynamic networks. Thus, to cause the secondary device to distinguish different networking access points created by the terminal device used as the master device to correctly cause the secondary device to access the network that the secondary device needs to access, access identifications can be generated for different networking access points in a one-to-one correspondence. That is, the access identifications can accurately differentiate different networking access points created by a same master device or different master devices of different networks. The present disclosure does not limit the content of the access identification.

Based on this, the enrollment message broadcast by the master device can include the access identification of the created networking access point AP, and the device identification, the broadcasting communication identification, the communication account information, and other message structures of the maser device, which is determined according to the broadcast protocol and is not described in detail here. Any one of the determined secondary devices can receive the enrollment message broadcast by the master device, parse the enrollment message, and determine which device is the master device through the message content and the networking access point for the networking. After determining the networking access point that needs to be accessed, the secondary device can provide the enrollment response message back to the master device that creates the networking access point to notify the master device of an access request for accessing the networking access point created by the master device. Then, the master device can determine whether to allow the secondary device to access the networking access point. The present disclosure does not describe the implementation of the networking connection from end to end between the master device and each secondary device.

In some embodiments, to improve the efficiency of the dynamic networking, the networking feature data of the devices can be dynamically updated periodically or when the configuration of the devices is detected to be updated. The process can be performed when the corresponding device is the master device or the secondary device of the network. Thus, when the master device of the network is disconnected or the master device and the secondary devices need to be reauthenticated, the most updated networking feature data can be directly read to determine the master device according to the method above, which saves time for waiting to obtain the networking feature data.

In some embodiments, after the device is turned on to enter the dynamic networking mode, the device can obtain its networking feature data to ensure the networking feature data obtained by the device to accurately represent the networking capability of the current device and also save the resource waste caused by continuously and dynamically updating the networking feature data of the devices that do not participate in the dynamic networking. The present disclosure does limit the implementation of the device obtaining its networking feature data.

In summary, when the dynamic networking is needed to determine the master device and the secondary devices of the network, after the devices that need to perform the dynamic networking obtain the networking feature data representing the networking capabilities of the devices, the election messages including the networking feature data can be broadcast. Thus, the plurality of devices participating the dynamic networking can negotiate in connection with the networking capabilities to ensure the networking capability of the elected master device can reliably meet the requirements of the networking service in the current device interconnection environment to improve the performance of the overall device interconnection environment. Especially for the complex environment for the networking of a series of comparable devices, the dynamic networking method in connection with the networking capabilities of the devices can be used to greatly improve the networking efficiency and strength compared to configuring the master device and the secondary devices manually by the user.

Figure 2:
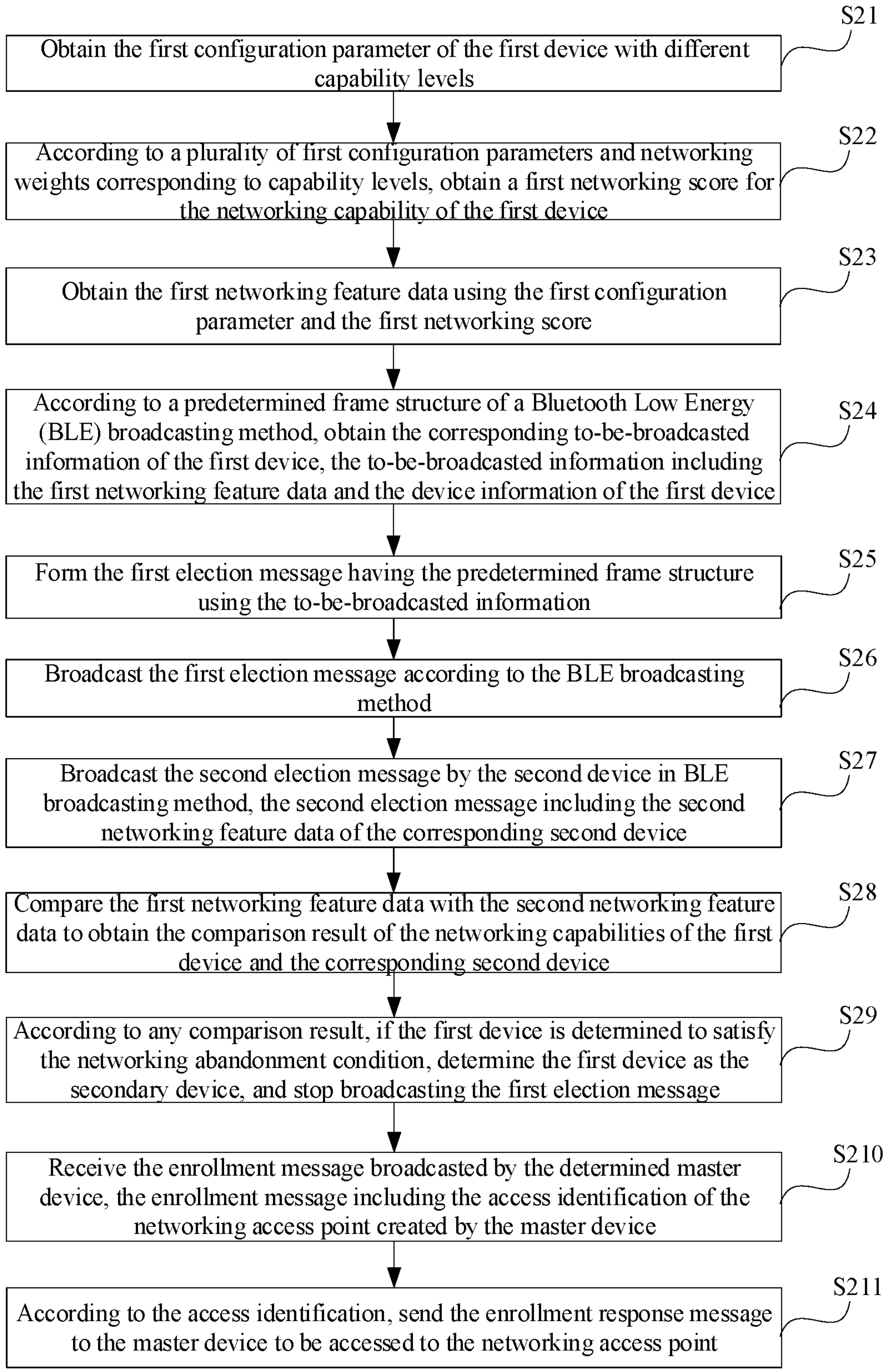
FIG. 2 illustrates a schematic flowchart of another dynamic networking method according to some embodiments of the present disclosure.

FIG. 2 illustrates a schematic flowchart of another dynamic networking method according to some embodiments of the present disclosure. The method can also be applied to the first device, that is, any device participating the dynamic networking. The above dynamic networking method can be further refined and described. As shown in FIG. 2, the method includes the following processes.

At S21, the first configuration parameter of the first device with different capability dimensions is obtained.

At S22, according to a plurality of first configuration parameters and networking weights corresponding to capability dimensions, a first networking score for the networking capability of the first device is obtained.

In connection with the related description of the networking feature data of the device, according to the current networking service requirements, the plurality of capability dimensions representing the networking capability of the first device in the service can be determined, e.g., the external network bandwidth, the audio/video input/output, the device type, etc. Then, the configuration parameter currently included in the first device corresponding to the capability dimension can be obtained and can be referred to as the first configuration parameter.

Since different capability dimensions can have different contributions/impacts on the networking capability of the first device, to accurately obtain the networking capability of the device, the networking weights corresponding to the capability dimensions can be determined according to the impact degrees of the configuration parameters under the capability dimensions on the device networking capability. Then, according to the configuration parameters under the different capability dimensions of the device and the corresponding networking weights, the networking score of the current networking capability of the device can be calculated in a calculation method of weighted summation. The dimensions of the networking capability of the device can be represented by the value of the score. The present disclosure does not limit the calculation method for the networking capability.

In some embodiments, based on artificial intelligence (AI) learning algorithms, such as machine learning, deep learning, transfer learning, etc., different sample parameters of the devices in the plurality of capability dimensions can be used for model training to obtain a networking capability prediction model of predicting the networking capability of the different devices in the dynamic networking scene. Thus, when the first device starts to initiate the dynamic networking, the current first configuration parameter of the first device in the different capability dimensions can be collected and input into the networking capability prediction model for processing. Then, the networking score representing the networking capability of the first device can be output.

Figure 3:
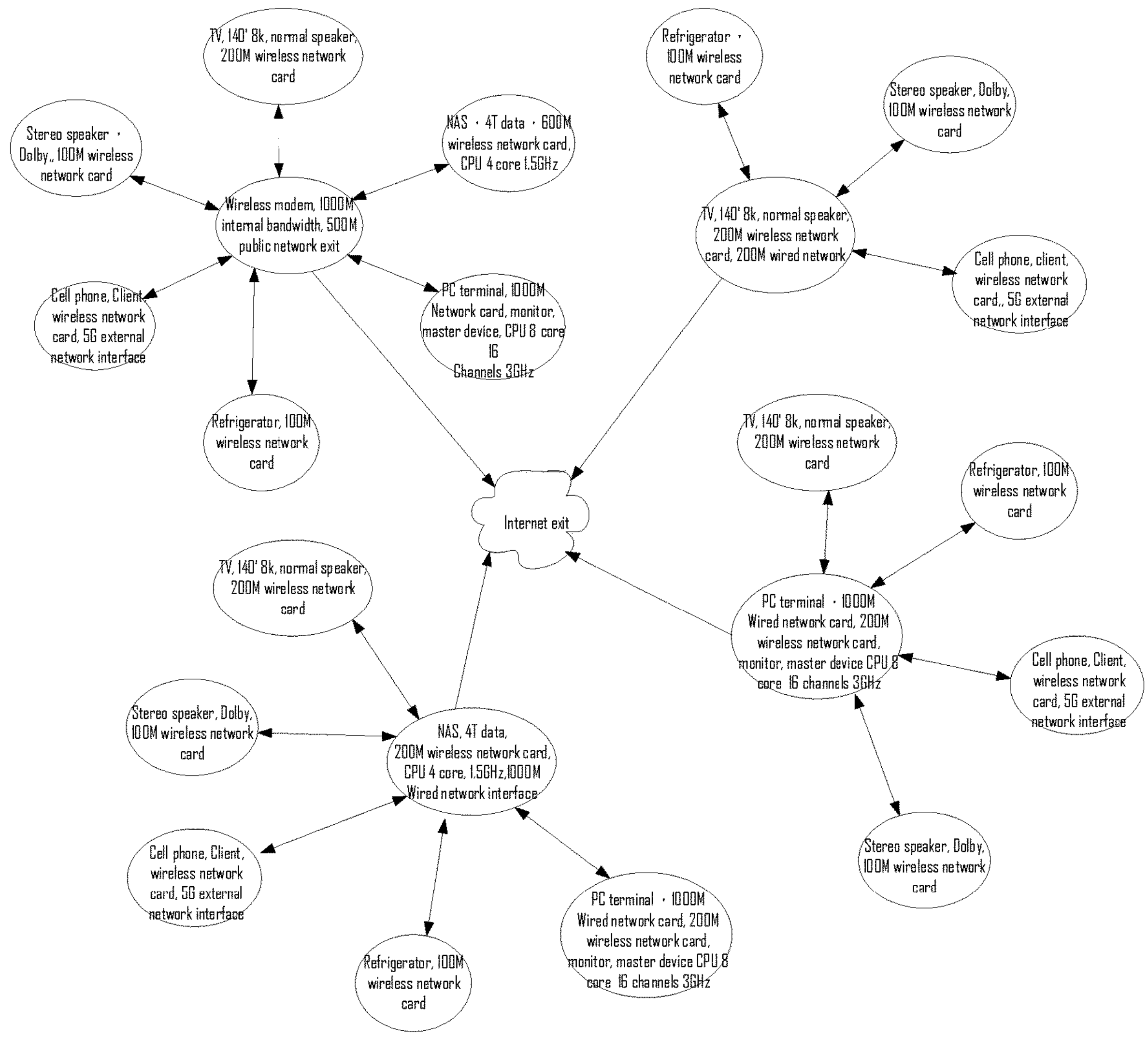
FIG. 3 illustrates a schematic diagram showing a networking environment for a dynamic networking method according to some embodiments of the present disclosure closure.

In some embodiments, in the process of obtaining the networking score above, in connection with the networking environment shown in FIG. 3, the device type is used as a capability dimension representing the networking capability. The networking weight can be also referred to as the device weight and can be determined according to the requirements of the to-be-satisfied service for the device of such type, i.e., the device of such type can satisfy the requirements of the service. In some embodiments, for a device, such as a TV, monitor, speaker, etc., with a single function, the networking weights of the capability dimensions can be relatively low. The corresponding capability represented by the configuration parameters under other capability dimensions can be poor. According to the above calculation method, the obtained networking score of the corresponding device can be low. Thus, the device can have the poor capability for competing for the master device, similarly, for home appliances such as a refrigerator, a wash machine, etc. Thus, the above devices can have low capability dimensions and even may not have some capability. Therefore, the networking scores of the above devices can be low, and the above devices can only be used as the secondary devices.

Additionally, for a network device capable of providing high-speed channels within a local area network (LAN) and an external network exit, such as a router, the networking weight of the network device can be usually high to obtain a high networking score and become the master device of the dynamic networking. Other devices can directly give up competing for the master device. An NAS device can have the data storage function and the CPU calculation function, and also have a strong wireless network card for supporting the wireless communication needs of the LAN. Thus, according to the calculation method of the networking capability, the networking score of the NAS device can be relatively high and can be usually higher than the device such as the TV. Thus, the NAS device can become the master device in some networking environments.

Computer devices such as smartphones and computers can have strong capabilities in various dimensions as described. According to the calculation method, computer devices can obtain high networking scores. When the computer device participates in the dynamic networking, the computer device can be elected as the master device, which is not limited. In some embodiments, since the computer device supports the configuration function for the networking weights, the user can manually configure the networking weights for the dimensional capabilities of the computer device. In some embodiments, if the computer device has a Giga byte exit network and Giga byte wireless network card with a plurality of channels, the user can directly select the computer device as the master device, which can ensure the performance of the overall device interconnection environment. The implementation process is not limited in the present disclosure.

In some embodiments of the present disclosure, in the interconnection environment of the plurality of devices, the networking capability of the devices can be demonstrated by the service-carrying capability in the networking communication process of the device, which is related to the capabilities of a plurality of dimensions such as the CPU calculation capability, the memory capacity MT, and the bandwidth capacity BT of the device. Thus, in the process of obtaining the networking score of the device, according to the configuration parameters included in the capability dimensions, such as the CPU processing frequency CV and CPU core number CN, the memory available capacity MV, and the available bandwidth BV of the network card, the networking score of the device can be obtained in connection with the networking weights representing the impact degree of the capabilities of the different dimensions on the networking capability (i.e., carrying capability) of the device.

The total sum of networking weights for the dimensional capabilities for calculating the networking score can be 1. In some embodiments, the device can perform other APPs when participating the dynamic networking. To avoid disrupting the operation of the other APPs, some capability used by the other APPs can be reserved for the dimensional capabilities of the device in calculating the score. Thus, the corresponding capability weights can be configured for different dimensional capabilities and represent the ratio of the corresponding dimensional capability used for dynamic networking.

In some embodiments, a networking score of a to-be-networked device can be calculated as follows. The CPU calculation capability of the device CT=CPU processing frequency CV*CPU core number CN*capability weight 0.6. The memory capacity of the device MT=memory available capacity MV*0.6. The bandwidth capacity BT=network available bandwidth BV*capability weight 0.5. The networking weighs for the capabilities of the three dimensions of the CPU calculation capability CT, the memory capacity MT, and the bandwidth capacity BT of the device can be 0.5, 0.3, and 0.2. Based on this, the networking score of the device ET=CT*0.5+MT*0.3+BT*0.2. The capability weights can be configured through experience/experiments and can be determined in connection with the device type, the function included in the device, and the configured application. The present disclosure does not limit the values of the capability weights, which are not limited to the values listed above.

Thus, process S21 and process S22 can include obtaining the CPU processing frequency, the CPU core number, the memory available capacity, and the network card available bandwidth of the first device, obtaining the first capability score representing the CPU calculation capability of the first device using the CPU processing frequency, the CPU core number, and the first capability weight, obtaining the second capability score representing the memory capacity of the first device using the memory available capacity and the second capability weight, and obtaining the third capability score representing the bandwidth capacity of the first device using the network card available bandwidth and the third capability weight. Then, a weighted sum can be performed on the first capability score, the second capability score, the third capability score, and the networking weights of the capabilities of the corresponding dimensions to obtain the first networking score for the networking capability of the first device.

In the process of calculating the device networking capability, if other dimensional capabilities need to be considered, according to the above method, after determining the corresponding capability weights and adjusting the networking weights of all dimensional capabilities that need to be considered, the networking score of the device can be obtained by performing the weighted sum on the capability scores of the dimensional capabilities. The implementation process is not limited in the present disclosure. In addition, for other devices participating in the dynamic networking, e.g., every second device, the second networking score of the networking capability of the device can be obtained according to the above method. The implementation process of the present disclosure is not described here.

At S23, the first networking feature data is obtained using the first configuration parameter and the first networking score.

To facilitate knowing the configuration of the other devices participating in the dynamic networking in the subsequent negotiation of the plurality of devices, each device participating in the dynamic networking can construct the networking feature data in serial by using the configuration parameter of the device in different dimensional capabilities and the networking score for the calculated networking capability of the device. The implementation process serialization of the plurality of configuration parameters and the networking score is not described in detail.

At S24, according to a predetermined frame structure of a Bluetooth Low Energy (BLE) broadcasting method, the corresponding to-be-broadcast information of the first device is obtained. The to-be-broadcast information includes the first networking feature data and the device information of the first device.

At S25, the first election message having the predetermined frame structure is formed using the to-be-broadcast information.

At S26, the first election message is broadcast according to the BLE broadcasting method.

According to but is not limited to the above method, the first device can generate the election message including the first networking feature data after obtaining the first networking feature data representing the networking capability of the first device. The first device can notify the other devices of the networking capability of the first device by broadcasting the election message.

In some embodiments, according to the description of processes 24 to 26, the negotiation among the plurality of devices can be implemented using the BLE broadcasting method in the present disclosure. The frame structure of the broadcast election message can be determined in advance according to the actual needs. For example, the predetermined frame structure of the BLE broadcasting method can be 31-byte data frame structure. In connection with the message type and the to-be-broadcast information, the 31-byte election message can be formed. In addition to the first networking feature data, the to-be-broadcast information can further include the device information of the first device, such as one or more of a device type, a device manufacturer, a device nickname, a Bluetooth address, and an account ID.

For example, the 31-byte data frame structure of the election message can include three regions of 3 bytes of broadcasting flags, 4 bytes of device identifier UUID, and 24 bytes of service data. Each region can start with the length of various data types (obtained using the len function) and the device type (obtained using the function type). The data region formed by the 24 bytes can also include 2 bytes of data identification UUID and 20 bytes of data frame content, such as a frame header of a total frame number and the current frame, 6 bytes of Bluetooth address, the device nickname, and ID account information of a platform. The data identification UUID can include an 8-bit version number recorded by 1 byte. The first four bits can represent the major version number, and the last four bits can represent the minor version number. In the 8-bit version number recorded in a neighboring byte, the first four bits can represent the manufacturer, and the last four bits can represent the device type. The election message is not limited to the predetermined frame structure of the present disclosure.

Therefore, through a mutual transfer alliance, the plurality of devices can form a mutual transfer alliance for the election message in the BLE broadcasting method to notify the other devices of the networking capabilities of the plurality of devices and broadcast the device type and capability identification/configuration parameter. With the predetermined frame structure that is predefined, the content-carrying capability of the BLE broadcasting can be improved, according to the related description for the data region content, the ID account of the platform can be logged in synchronously among devices, the platform ID account can be unified to automatically create the connection. In some other embodiments, by broadcasting the wake-up instruction, the other devices can wake up. Thus, the other devices can be managed and controlled. The implementation process of how to use the BLE broadcasting method is not described in detail here.

In some embodiments, sending the election message can include broadcasting the predetermined frame by BLE to guide all the devices to access temporary networking access point AP and broadcasting the constructed election message sent according to user datagram protocol (UDP). Each independent device can have a random AP with a fixed format. After the configuration is initialized, the devices can be connected through the random AP to realize information transmission among devices. The present disclosure is not limited to the data transmission method.

At S27, the second election message is broadcast by the second device in the BLE broadcasting method. The second election message includes the second networking feature data of the corresponding second device.

Any one of the second devices can construct the second election message having the predetermined frame structure of the BLE broadcasting method. For the implementation of broadcasting the second election message in the BLE broadcasting method, reference can be made to the implementation of constructing and broadcasting the first election message, which is not repeated here.

After the second device broadcasts the second election message, the first device and other second devices can receive the second election message, the second networking feature data such as the device information of the second device, the second networking score, and the second configuration parameter of the plurality of dimensional capabilities can be known after parsing the second election message, the process of parsing the election message can be opposite to the process of constructing the election message, which is not described in detail here.

At S28, the first networking feature data is compared with the second networking feature data to obtain the comparison result of the networking capabilities of the first device and the corresponding second device.

At S29, according to any comparison result, if the first device is determined to satisfy the networking abandonment condition, the first device is determined as the secondary device, and broadcasting the first election message is stopped.

Continuing with the above analysis, after the first device learns the second networking feature data of any second device, which device of the first device and the second device has the stronger networking capability can be determined by comparing the first networking feature data to the second networking feature data. If the networking capability of the first device is stronger, the first device can still have the possibility of becoming the master device. The first device can continue to broadcast the first election message. Then, the networking capability of the first device can be compared to the networking capabilities of other second devices according to the above method.

On the contrary, the second device can be determined to have the stronger networking capability after the comparison. When the second device participates in competing for the master device, the first device cannot become the master device in the same network. Thus, the first device can stop broadcasting the first election message and abandon the competition for the master device. Thus, other devices (i.e., the second devices) may no longer receive the first election message. The networking capability may not need to be compared according to the above method. Thus, the calculation load and resource waste of the whole device interconnection environment can be greatly reduced, which facilitates quick and accurate selection of the master device with optimal networking capability to improve the networking efficiency.

Thus, the networking abandonment condition can include that the networking capability of the device is smaller than the networking capability of another device. In some embodiments, the networking score representing the networking capability of the device can be lower than the networking score of the another device. In some other embodiments, the two devices can have the same networking score. However, according to the order of the networking weights from large to small, the configuration parameter of the dimensional capability of the device can be smaller than the configuration parameter of the dimensional capability corresponding to the another device. That is, the dimensional capability of the device with the higher networking weight can be lower than the same dimensional capability of the another device. The content of the networking abandonment condition is not limited in the present disclosure.

For any one of the second devices participating in the dynamic networking, whether the networking capability of the second device is higher than the networking capabilities of the other devices can be determined in the above method. After the comparison and negotiation of the networking capabilities during a period, the device with the highest networking capability can be determined to be the master device. Based on the above, since the device may give up to be used as the master device due to the lower networking capability, the device can wait until the master device is selected. Thus, if the devices receive the election messages sent from the other devices, and the devices also send the election messages, the competition can be still on. The devices can still send the election messages. However, after a period, if no election message is received from the other devices, the other devices can be considered to abandon the competition for the master device. Thus, the device can be determined to be the master device.

At S210, the enrollment message broadcast by the determined master device is received, and the enrollment message includes the access identification of the networking access point created by the master device.

At S211, according to the access identification, the device sends the enrollment response message to the master device to access the networking access point.

For the implementation process of determining the master device according to the first networking feature data and any piece of the second networking feature data, reference can be made to the description of the related part in embodiments of the present disclosure. After the master device is determined, the networking access point AP can be created and can be notified to other surrounding devices, e.g., the other devices participating in the dynamic networking and abandoning the competition for the master device due to insufficient networking capability. Thus, the devices can access the networking access point AP. For the implementation process of constructing the networking environment, reference can be made to the description of the related part, which is not described in detail.

In connection with the related description of the predetermined frame structure in the Bluetooth broadcasting method. The enrollment response message broadcast by the secondary device can also have the predetermined frame structure. For example, the enrollment response message can include 31 bytes Bluetooth response data, including 1 byte data type length, 1 byte device type, 2 bytes of data UUID, 1 byte of 8-bit device status, 25 bytes of customization service data, and 1 byte of the reserved region (for recording the related content according to the actual needs). 2 bytes data uuid can include 1 byte device type (e.g., 0x01 represents a cell phone, 0x02 represents a tablet, 0x03 represents a personal computer, and 0x04 represents an IOT device, etc.). The other 1 byte can record the function supported by the device of sending the message (e.g., 0x01 represents a quick transmission function, 0x02 represents the screen projection of the first operation system device onto the second operation system device, 0x03 represents the screen projection of the second operation system device onto the first operation system device, 0x04 represents synchronous screen learning, and 0x05 represents device control). For the 8-bit device status, the first two bits can record a connection status (e.g., 00 represents not connected, 01 represents connected, and 10 represents abnormal connection). The last 2-bits can be used to record whether to support encryption and 5G. The present disclosure is not limited to the structure content of the enrollment response message of embodiments of the present disclosure.

Figure 4:
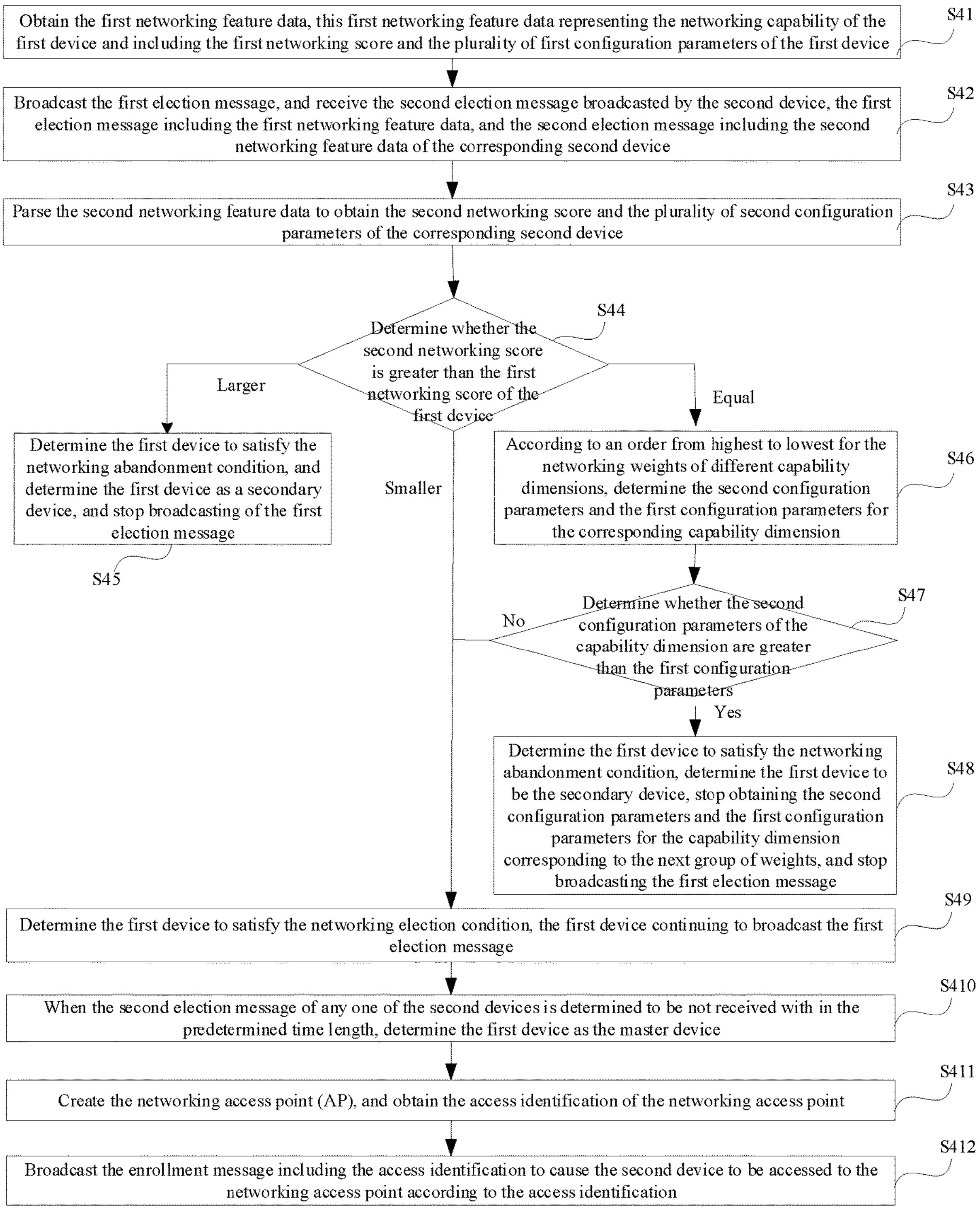
FIG. 4 illustrates a schematic flowchart of another dynamic networking method according to some embodiments of the present disclosure.

FIG. 4 illustrates a schematic flowchart of another dynamic networking method according to some embodiments of the present disclosure. The method can still be applied to the first device. The refined implementation method of comparing the networking capabilities of the first device and any one of the second devices in the above dynamic networking method can be described. As shown in FIG. 4, the method includes the following processes.

At S41, the first networking feature data is obtained. This first networking feature data represents the networking capability of the first device and includes the first networking score and the plurality of first configuration parameters of the first device.

At S42, the first election message is broadcast, and the second election message broadcast by the second device is received. The first election message includes the first networking feature data, and the second election message includes the second networking feature data of the corresponding second device.

For the implementation processes of process S41 and process S42, reference can be made to the corresponding description in embodiments of the present disclosure, which are not repeated here.

At S43, the second networking feature data is parsed to obtain the second networking score and the plurality of second configuration parameters of the corresponding second device.

At S44, whether the second networking score is greater than the first networking score of the first device is determined. If the second networking score is greater than the first networking score, the method proceeds to process S45. If the second networking score is less than the first networking score, process S49 is performed.

At S45, the first device is determined to satisfy the networking abandonment condition. The first device is determined as a secondary device, and the broadcasting of the first election message is stopped.

In connection with the related description of the acquisition process of the networking scores of the devices, the networking score can be calculated by considering the plurality of dimensional capabilities of the device and the networking weights of the plurality of dimensional capabilities. The value of the networking score can represent the level of the networking capability of the device. Thus, by comparing the first networking score to the second networking scores of the other devices, the first device can determine whether the networking capability of the first device is higher than the networking capability of the second device.

By comparing the networking scores, the networking capability of the first device can be determined to be lower than the networking capability of the any one of the second devices. The first device can choose to abandon the competition for the master device and may no longer broadcast the first election message. Thus, the other second devices (e.g., the second devices initiate the dynamic networking after the first device abandons the competition) may no longer need to compare the networking capability with the first device. The calculation load of the plurality of devices and the resource waste can be reduced, and the master device with the optimal networking capability can be quickly and accurately selected.

In some embodiments, for any device, e.g., the first device or the second device, after comparing the networking scores, the networking score of the device can be determined to be lower than the networking score of any other device. When abandoning broadcasting the election message, the device can broadcast the election abandonment message to notify the other devices that the device abandons the competition for the master device. The election abandonment message can further include the service requirements of the device and even include which device can satisfy the service requirements of the device. For example, according to the second configuration parameter of the corresponding second device, whether the networking capability of the corresponding device can satisfy the networking requirements of the device can be determined according to the actual needs. The implementation process of constructing and broadcasting the election abandonment message is similar to the implementation process of the election message, which is not described in detail here.

At S46, according to an order from highest to lowest for the networking weights of different capability dimensions, the second configuration parameters and the first configuration parameters are determined for the corresponding capability dimension.

At S47, whether the second configuration parameters of the capability dimension are greater than the first configuration parameters are determined. If yes, process S48 is performed, and if no, process S49 is performed.

At S48, the first device is determined to satisfy the networking abandonment condition. The first device is determined to be the secondary device. Obtaining the second configuration parameters and the first configuration parameters for the capability dimension corresponding to the next group of weights is stopped, and broadcasting the first election message is stopped.

According to the comparison of networking scores, if the second networking scores of the second devices currently received by the first device are equal to the first networking score, the networking capabilities of the devices that currently initiate the dynamic networking can be equivalent. Further comparison may be needed for fine information. In the present disclosure, the configuration parameter of a dimensional capability contributing the most to the networking capability of the device can be selected. For example, the configuration parameters of the dimensional capability with the highest networking weight can be compared to determine which device has the higher networking capability. When the configuration parameter is larger, the corresponding dimensional capability can be stronger, and the networking capability of the device can be stronger.

In some other embodiments, if the first configuration parameter of the dimensional capability with the highest networking weight is the same as the second configuration parameter of the second device under the dimensional capability, a comparison can be made to the configuration parameters under a dimensional capability with the second largest networking weight of the first device and the second device to determine which device of the first device and the second device has the stronger networking capability. Through the fine information comparison, the networking capability of the first device can be determined to be poor. Thus, the first device can abandon the competition for the master device and can be used as the secondary device to wait for the master device to broadcast the enrollment message.

At S49, the first device is determined to satisfy the networking election condition, the first device continues to broadcast the first election message.

According to the comparison method for the networking capability, the networking capability of any one of the second devices can be determined to be lower than the networking capability of the first device. Thus, the first device can satisfy the networking election condition. The first device can continue to participate in the competition for the master device and continue to broadcast the first election message. In connection with the above analysis, the networking election message can include but is not limited to the first networking score of the first device being larger than the second networking score of any one of the second devices, or the first networking score of the first device being equivalent with the second networking scores of the second devices. The first configuration parameter of the dimensional capability with the highest networking weight of the first device can be larger than the second configuration parameter of the dimensional capability of any one of the second devices.

At S410, when the second election message of any one of the second devices is determined to be not received within the predetermined time length, the first device is determined as the master device.

At S411, the networking access point (AP) is created, and the access identification of the networking access point is obtained.

Step S412, the enrollment message including the access identification is broadcast to cause the second device to be accessed to the networking access point according to the access identification.

Since the devices participating in the dynamic networking initiate dynamic networking at different time, to accurately determine the device with the optimal networking capability as the master device, after determining the networking capability of the first device to be higher than the networking capability of the second device of the second election message that is currently received, the first device can be temporarily determined as the master device. The first device can continue to wait until another second device sends the second election message, if no second election message of any one of the second devices is received within the predetermined time length, the second devices that currently initiate the dynamic networking may abandon the competition for the master device. The first device can be determined as the master device, the networking access point AP can be created according to subsequent processes to notify the other devices to access the networking access point AP.

After determining that the device with the poor networking capabilities is the first device and the other second devices by comparing the networking capabilities, such device can wait for the determined master device to send the enrollment message, which can be referred to the description of the related part in embodiments of the present disclosure. The device can access the networking access point AP created by the master device. The implementation process is not described in detail.

In some other embodiments of the present disclosure, by comparing the networking capabilities of the above plurality of devices, the first networking score of the first device can be the same as the second networking capabilities of the second device, or the first configuration parameter of the capability dimension of the first device can be further determined to be the same as the second configuration parameter under the same dimension capability of the corresponding second device. In the present disclosure, according to the broadcasting order of the election messages, the device that broadcasts the election message first can be the master device.

Thus, the first device can obtain the first broadcasting time included in the first election message and the second broadcasting time included in the second election message, the first broadcasting time can be compared to the second broadcasting time. If the first broadcasting time is later than any of the second broadcasting time, the first device can be determined to satisfy the networking abandonment condition, and broadcasting the first election message can be stopped. Otherwise, if the first broadcasting time is earlier than the second broadcasting time, the first device can continue to wait to determine whether there is another second device sending the second election message, and process S410 can be performed to realize the dynamic networking.

When the devices construct the election messages, the current time stamp can be obtained as the broadcasting time, which can be added to the election message. To improve safety, the safety chip can be used to encrypt the broadcasting time, and then, the broadcasting time can be written into a corresponding position of the election message, e.g., the header position or the data region of the predetermined frame structure. Thus, the illegal device can be prevented from determining the master device and then attacking the master device according to the broadcasting time. The present disclosure does not limit the encryption method for the broadcasting time.

In some other embodiments, to ensure the safety between the interaction of the devices, for the to-be-broadcast content of the networking feature data, the safety chip (e.g., RJMU 401, which is configured with an SM4 hardware encryption algorithm) can be used to encrypt the to-be-broadcast content, and then, the generated election message can be broadcast. The encryption method is not limited in the present disclosure. In some embodiments, the first device can use the predetermined hardware encryption features, such as Bluetooth Media Access Control Address (MAC), to perform hardware encryption on the first configuration parameter and the first networking score to obtain the first networking capability encrypted text. Then, the first networking capability encrypted text can be serialized to obtain the first networking feature data. Then, the first election message can be constructed and broadcast according to the above method.

Similarly, other second devices having the safety chips can also adopt the encryption method to obtain the encrypted second networking feature data to construct and broadcast the second election message. Thus, the first device can continue to receive the second election message broadcast by the second device. The safety chip can be used to decrypt. The encrypted second networking feature data can be decrypted using the hardware encryption algorithm included in the safety chip according to the predetermined hardware encryption feature such as the Bluetooth MAC of the second device included in the second election message. Then, the second networking scores and the second configuration parameters of the second devices can be obtained. In the present disclosure, the method of using the safety chip to perform information encryption and decryption is not limited here.

In the process of dynamic networking, information that needs to be encrypted can be encrypted in the hardware encryption method to ensure the safety of the data transmission. In addition, with the hardware encryption method using the predetermined hardware encryption feature, the efficiency of the decryption can also be ensured. The content of the predetermined hardware encryption feature is not limited in the present disclosure.

In connection with the dynamic networking method, when a batch of equivalent devices needs dynamic networking, some devices may need to be interconnected for some complex networking environments to form a system for providing service functions for the user to use. In some embodiments, in connection with the networking environment shown in FIG. 3, when the TV plays a program, the TV and a speaker can form a directly connected network from end to end to realize audio data interaction. However, when the user needs to use the cell phone to operate to cause the TV to play a movie from the NAS device and the speaker to broadcast the audio of the movie, if the four devices are still directly connected, the cost and complexity can be very high.

To address the above problems, the present disclosure provides a dynamic networking method to compare the networking capabilities of the TV, the speaker, the cell phone, and the NAS device to automatically and efficiently determine the cell phone as the master device and other devices as the secondary devices. Then, the user can directly operate the cell phone to send control instructions to the corresponding secondary devices to control the secondary devices to perform the required functions, which is convenient and reduces the operation cost.

Figure 5:
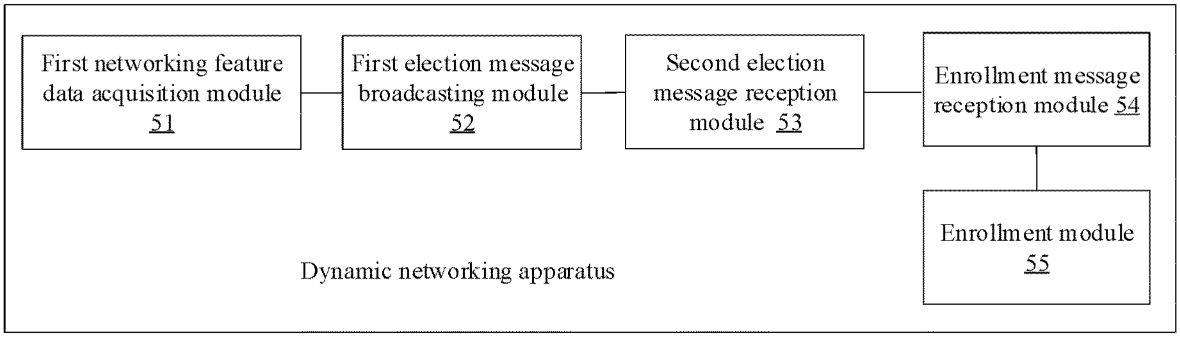
FIG. 5 illustrates a schematic structural diagram of a dynamic networking apparatus according to some embodiments of the present disclosure.

FIG. 5 illustrates a schematic structural diagram of a dynamic networking apparatus according to some embodiments of the present disclosure. As shown in FIG. 5, the apparatus includes a first networking feature data acquisition module 51 and a first election message broadcasting module 52.

The first networking feature data acquisition module 51 can be configured to obtain the first networking feature data. The first networking feature data can represent the networking capability of the first device.

The first election message broadcasting module 52 can be configured to broadcast the first election message. The first election message can include the first networking feature data.

In some embodiments, the first election message broadcasting module 52 can include a to-be-broadcast information acquisition unit, a first election message formation unit, and a first election message broadcasting unit.

The to-be-broadcast information acquisition unit can be configured to obtain the corresponding to-be-broadcast information of the first device according to the predetermined frame structure in the BLE broadcasting method. The to-be-broadcast information can include the first networking feature data and the device information of the first device.

The first election message formation unit can be configured to form the first election message having the predetermined frame structure using the to-be-broadcast information.

The first election message broadcasting unit can be configured to broadcast the first election message in the BLE broadcasting method.

The apparatus further includes a second election message reception module 53, an enrollment message reception module 54, and an enrollment module 55.

The second election message reception module 53 can be configured to receive the second election message broadcast by the second device. The second election message can include the second networking feature data corresponding to the second device.

The enrollment message reception module 54 can be configured to receive the enrollment message broadcast by the determined master device. The master device can be determined according to the first networking feature data and any of the second networking feature data. The enrollment message can include the access identification of the networking access point created by the master device.

The enrollment module 55 can be configured to send an enrollment response message to the master device according to the access identification to access the networking access point.

In some embodiments, the first networking feature data acquisition module 51 can include a first configuration parameter acquisition unit, a first networking score acquisition unit, and a first networking feature data acquisition unit.

The first configuration parameter acquisition unit can be configured to obtain the first configuration parameters of the first device in different capability dimensions.

The first networking score acquisition unit can be configured to obtain the first networking score for the networking capability of the first device according to the plurality of first configuration parameters and the networking weights corresponding to the capability dimensions.

The first networking feature data acquisition unit can be configured to obtain the first networking feature data using the first configuration parameters and the first networking score.

In some embodiments, the first networking feature acquisition unit can include a hardware encryption processing unit and a serialization processing unit.

The hardware encryption processing unit can be configured to perform hardware encryption processing on the first configuration parameters and the first networking score using the predetermined hardware encryption feature to obtain the first networking capability encrypted text.

The serialization processing unit can be configured to perform the serialization processing on the first networking capability encrypted text to obtain the first networking feature data.

In some other embodiments, the apparatus further includes a comparison determination module configured to determine that the first device satisfies the networking abandonment condition according to the comparison result of the first networking feature data and any of the second networking feature data to determine the first device as the secondary device to stop broadcasting the first election message.

In some embodiments, the comparison determination module can include a parsing unit, a first comparison unit, and a first determination unit.

The parsing unit can be configured to parse the second networking feature data to obtain the second networking score and the plurality of second configuration parameters of the corresponding second device.

The first comparison unit can be configured to compare the second networking score and the first networking score of the first device.

The first determination unit can be configured to, if the second networking score is greater than the first networking score, determine that the first device satisfies the networking abandonment condition.

In some embodiments, the comparison determination module can further include a configuration parameter acquisition unit and a second determination unit.

The configuration parameter acquisition unit can be configured to determine that the second networking score is equal to the first networking score and obtain the second configuration parameter and the first configuration parameter of the corresponding capability dimension according to the order of the networking weights of the different capability dimensions from large to small.

The second determination unit can be configured to, if the second configuration parameter is greater than the first configuration parameter under the capability dimension, determine that the first device satisfies the networking abandonment condition and stop obtaining the second configuration data and the first configuration data of the capability dimension corresponding to the next networking weight.

In some embodiments, the comparison determination module can further include a broadcasting time acquisition unit and a third determination unit.

The broadcasting time acquisition unit can be configured to determine that the second configuration parameters are equal to the first configuration parameters under different capability dimensions and obtain the first broadcasting time included in the first election message and the second broadcasting time included in the second election message.

The third determination unit can be configured to, if the first broadcasting time is later than the second broadcasting time, determine that the first device satisfies the networking abandonment condition.

In some other embodiments, the apparatus further includes a broadcasting determination module, a master device determination module, a networking access point creation module, and an enrollment message broadcasting module.

The broadcasting determination module can be configured to determine that the first device satisfies the networking election message according to the comparison result of the first networking feature data and any of the second networking feature data and return to broadcast the first election message.

The master device determination module can be configured to determine that the second election message broadcast by the second device is not received within the predetermined time length and trigger to determine the first device as the master device.

The networking access point creation module can be configured to create the networking access point and obtain the access identification of the networking access point.

The enrollment message broadcasting module can be configured to broadcast the enrollment message including the access identification.

The modules and units of apparatus embodiments can be implemented as program modules and stored in the memory. The processor can perform the program modules stored in the memory to implement the corresponding functions. For the functions realized by the program modules and a combination of the program modules and the technical effects, reference can be made to the related description of method embodiments, which are not repeated here.

The present disclosure further provides a computer-readable storage medium storing a computer program that, when executed and loaded by the processor, causes the processor to implement processes of the dynamic networking method.

Figure 6:
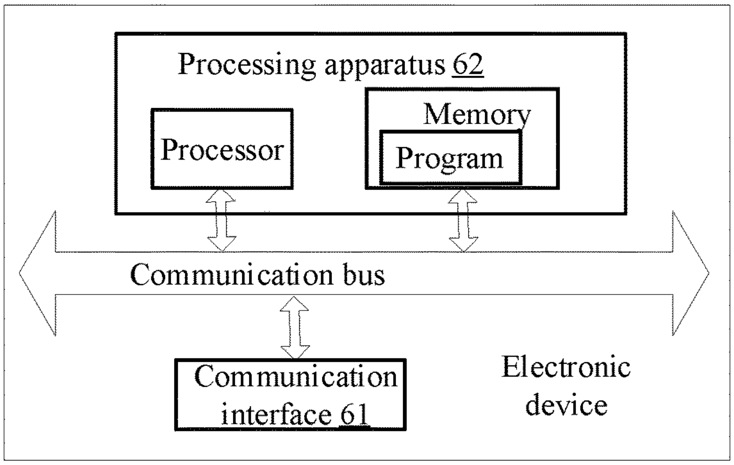
FIG. 6 illustrates a schematic structural diagram of an electronic device for dynamic networking according to some embodiments of the present disclosure.

FIG. 6 illustrates a schematic structural diagram of an electronic device for dynamic networking according to some embodiments of the present disclosure. The product type of the electronic device is described in the related embodiments of the present disclosure. The present disclosure does not limit the type of the electronic device participating the dynamic networking. As shown in FIG. 6, the electronic device includes a communication interface 61 and a processing apparatus 62.

The communication interface 61 can include a wireless communication interface supporting a wireless communication method, such as Bluetooth, WIFI, 5G/6G (fifth generation mobile communication network/sixth generation mobile communication network), GPRS, and a wired communication interface supporting a wired communication method, such as a wired network interface and a data interface. In some embodiments, the communication interface 61 can also include an interface supporting the data interaction of the internal members of the electronic device, such as a USB interface, an I/O interface, and a serial/parallel interface as needed. The interface type of the communication interface 61 can be determined according to actual needs.

The processing apparatus 62 can be configured to perform the dynamic networking method. For the implementation, reference can be made to the description of the corresponding part of embodiments of the present disclosure, which is not repeated here.

In some embodiments, the processing apparatus 62 can include a memory and a processor. The memory can store the networking feature data, the message, and the program for implementing the dynamic networking method of the present disclosure. The processor can be configured to perform the program to implement the dynamic networking method of the present disclosure. The memory can include a high-speed random access memory or a non-volatile memory, such as at least one disk storage device or other volatile solid-state storage devices. The processor can be a central processing unit (CPU), an application-specific integrated circuit (ASIC), a digital signal processor (DSP), a dedicated integrated circuit (ASIC), a field-programmable gate array (FPGA), or other programmable logic devices, which can be determined according to the actual situation.

The structure of the electronic device shown in FIG. 6 does not limit the electronic device in embodiments of the present disclosure. In some embodiments, the electronic device can include more members than those shown in FIG. 6, or grouped members, such as at least one input assembly of a touch sensing unit, a keyboard, a mouse, a camera, a microphone, etc., for sensing a touch event on a touch-sensitive display panel, at least one output assembly of a monitor, a speaker, a vibration mechanism, lights, etc., an antenna, a sensor module, and a power supply module, which can be determined according to the device type and functional needs of the electronic device, which is not listed in detail here.

In embodiments mentioned above, unless explicitly indicated otherwise in the context, terms such as “one,” “an,” “a,” and/or “the” do not specifically refer to singular but may include plural. Generally, the terms “comprising” and “including” only indicate the inclusion of identified steps and elements, and these steps and elements do not exclude the existence of other steps and elements. The method or device can also include other steps or elements. The elements specified by “comprising a . . . ” do not exclude the presence of additional identical elements in the process, method, product, or device including the elements.

In embodiments of the present disclosure, unless otherwise specified, “/” represents “or.” For example, A/B represents A or B. The term “and/or” used in the present disclosure only represents the relationship between associated objects, indicating three relationships. For example, A and/or B can represent A alone, A and B, and B alone. In addition, “a plurality of” indicates two or more.

The terms “first” and “second” are merely used for descriptive purposes to distinguish an operation, an unit, or a module from another operation, another unit, or another module. The terms do not necessarily imply any actual relationship or sequence between the units, operations, or modules. The terms cannot be understood as indicating or implying the relative importance or implying the indication of the number of technical features. Thus, the feature limited by “first” and “second” can indicate or imply one or more features.

Embodiments of the present disclosure are described in a progressive or parallel manner. Each embodiment focuses on the differences from other embodiments. The same and similar parts between various embodiments can be referred to each other. Since the apparatus and electronic device of the present disclosure correspond to the method of the present disclosure, the description is relatively simple. For relevant details, reference can be made to the description of the method part.

The description of embodiments of the present disclosure enables those skilled in the art to implement or use the present disclosure. Various modifications to these embodiments are apparent to those skilled in the art. The generic principles defined here may be implemented in other embodiments without departing from the spirit or scope of the present disclosure. Therefore, the present disclosure is not limited to the described embodiments but conforms to the widest scope consistent with the principles and novel features of the present disclosure.

What is claimed is:

1. A dynamic networking method applied to a first device comprising:

obtaining first networking feature data, the first networking feature data representing a networking capability of the first device;

broadcasting a first election message and receiving a second election message broadcast by a second device, the first election message including the first networking feature data, and the second election message including second networking feature data of the corresponding second device;

determining a master device based on the first networking feature data and the second networking feature data, including:

obtaining a comparison result of the first networking feature data and the second networking feature data; and in response to the comparison result indicating that a networking capability of the first device is stronger than a networking capability of the second device, determining that the first device satisfies a networking election condition and continuing to broadcast the first election message;

in response to the first device not being determined as the master device, receiving an enrollment message broadcast by the determined master device, the enrollment message including an access identification of a networking access point created by the master device; and sending an enrollment response message to the master device according to the access identification to access the networking access point.

2. The method according to claim 1, wherein obtaining the first networking feature data includes:

obtaining first configuration parameters of the first device in different capability dimensions;

obtaining a first networking score for the networking capability of the first device according to the first configuration parameters and networking weights corresponding to the capability dimensions; and obtaining the first networking feature data using the first configuration parameters and the first networking score.

3. The method according to claim 2, wherein obtaining the first networking feature data using the first configuration parameters and the first networking score includes:

performing hard encryption processing on the first configuration parameters and the first networking score using a predetermined hardware encryption feature to obtain a first networking capability encrypted text; and performing serialization on the first networking capability encrypted text to obtain the first networking feature data.

4. The method according to claim 2, further comprising:

according to the comparison result of the first networking feature data and the second networking feature data, determining that the first device satisfies a networking abandonment condition, determining the first device as a secondary device, and stopping broadcasting the first election message.

5. The method according to claim 4, wherein determining that the first device satisfies the networking abandonment condition according to the comparison result of the first networking feature data and the second networking feature data includes:

parsing the second networking feature data to obtain a second networking score and a plurality of second configuration parameters of the corresponding second device;

comparing the second networking score with the first networking score of the first device; and in response to the second networking score being greater than the first networking score, determining that the first device satisfies the networking abandonment condition.

6. The method according to claim 5, wherein determining that the first device satisfies the networking abandonment condition according to the comparison result of the first networking feature data and the second networking feature data further includes:

determining that the second networking score is equal to the first networking score, obtaining a second configuration parameter and a first configuration parameter of a corresponding capability dimension according to an order of networking weights of different capability dimensions from large to small; and in response to the second configuration parameter being greater than the first configuration parameter, determining that the first device satisfies the networking abandonment condition and stopping obtaining the second configuration parameter and the first configuration parameter of the capability dimension corresponding to a next networking weight.

7. The method according to claim 6, wherein determining that the first device satisfies the networking abandonment condition according to the comparison result of the first networking feature data and the first second networking feature data further includes:

determining that the second configuration parameters under different capability dimensions are equal to the first configuration parameters, and obtaining first broadcasting time included in the first election message and second broadcasting time included in the second election message; and in response to the first broadcasting time being later than the second broadcasting time, determining that the first device satisfies the networking abandonment condition.

8. The method according to claim 4, further comprising:

determining that the second election message broadcast by the second device is not received within a predetermined time length, triggering to determine the first device as the master device;

creating a networking access point and obtaining an access identification of the networking access point; and broadcasting an enrollment message including the access identification.

9. The method according to claim 1, wherein broadcasting the first election message includes:

obtaining corresponding to-be-broadcast information of the first device according to a predetermined frame structure of a Bluetooth Low Energy (BLE) broadcasting method, the to-be-broadcast information including the first networking feature data and device information of the first device;

forming a first election message having the predetermined frame structure using the to-be-broadcast information; and broadcasting the first election message in the BLE broadcasting method.

10. An electronic device comprising:

a communication interface; and a processing apparatus including:

a processor; and a memory storing a computer program that, when executed by the processor, causes the processor to:

obtain first networking feature data, the first networking feature data representing a networking capability of the first device;

broadcast a first election message and receive a second election message broadcast by a second device, the first election message including the first networking feature data, and the second election message including second networking feature data of the corresponding second device;

determine a master device based on the first networking feature data and the second networking feature data, including:

obtaining a comparison result of the first networking feature data and the second networking feature data; and in response to the comparison result indicating that a networking capability of the first device is stronger than a networking capability of the second device, determining that the first device satisfies a networking election condition and continuing to broadcast the first election message;

in response to the first device not being determined as the master device, receive an enrollment message broadcast by the determined master device, the enrollment message including an access identification of a networking access point created by the master device; and send an enrollment response message to the master device according to the access identification to access the networking access point.

11. The device according to claim 10, wherein the processor is further configured to:

obtain first configuration parameters of the first device in different capability dimensions;

obtain a first networking score for the networking capability of the first device according to the first configuration parameters and networking weights corresponding to the capability dimensions; and obtain the first networking feature data using the first configuration parameters and the first networking score.

12. The device according to claim 11, wherein the processor is further configured to:

perform hard encryption processing on the first configuration parameters and the first networking score using a predetermined hardware encryption feature to obtain a first networking capability encrypted text; and perform serialization on the first networking capability encrypted text to obtain the first networking feature data.

13. The device according to claim 11, wherein the processor is further configured to:

according to the comparison result of the first networking feature data and the second networking feature data, determine that the first device satisfies a networking abandonment condition, determining the first device as a secondary device, and stopping broadcasting the first election message.

14. The device according to claim 13, wherein the processor is further configured to:

parse the second networking feature data to obtain a second networking score and a plurality of second configuration parameters of the corresponding second device;

compare the second networking score with the first networking score of the first device; and in response to the second networking score being greater than the first networking score, determine that the first device satisfies the networking abandonment condition.

15. The device according to claim 14, wherein the processor is further configured to:

determine that the second networking score is equal to the first networking score, and obtain a second configuration parameter and a first configuration parameter of a corresponding capability dimension according to an order of networking weights of different capability dimensions from large to small; and in response to the second configuration parameter being greater than the first configuration parameter, determine that the first device satisfies the networking abandonment condition and stopping obtaining the second configuration parameter and the first configuration parameter of the capability dimension corresponding to a next networking weight.

16. The device according to claim 15, wherein the processor is further configured to:

determine that the second configuration parameters under different capability dimensions are equal to the first configuration parameters, and obtain first broadcasting time included in the first election message and second broadcasting time included in the second election message; and in response to the first broadcasting time being later than the second broadcasting time, determine that the first device satisfies the networking abandonment condition.

17. The device according to claim 13, wherein the processor is further configured to:

determine that the second election message broadcast by the second device is not received within a predetermined time length, and trigger to determine the first device as the master device;

create a networking access point and obtain an access identification of the networking access point; and broadcast an enrollment message including the access identification.

18. The device according to claim 10, wherein the processor is further configured to:

obtain corresponding to-be-broadcast information of the first device according to a predetermined frame structure of a Bluetooth Low Energy (BLE) broadcasting method, the to-be-broadcast information including the first networking feature data and device information of the first device;

form a first election message having the predetermined frame structure using the to-be-broadcast information; and broadcast the first election message in the BLE broadcasting method.

19. A dynamic networking method applied to a first device comprising:

obtaining first networking feature data, the first networking feature data representing a networking capability of the first device;

broadcasting a first election message and receiving a second election message broadcast by a second device, the first election message including the first networking feature data, and the second election message including second networking feature data of the corresponding second device;

determining a master device based on the first networking feature data and the second networking feature data, including:

comparing a first networking score included in the first networking feature data with a second networking score included in the second networking feature data; and in response to the first networking score being equal to the second networking score, obtaining a first configuration parameter of the first device and a second configuration parameter of the second device in a selected capability dimension that is determined according to an order of networking weights of different capability dimensions from large to small; and determining the master device based on a comparison of the first configuration parameter and the second configuration parameter in the selected capability dimension;

in response to the first device not being determined as the master device, receiving an enrollment message broadcast by the determined master device, the enrollment message including an access identification of a networking access point created by the master device; and sending an enrollment response message to the master device according to the access identification to access the networking access point.

* * * * *